Oct. 30, 1923.
C. M. PAGE
1,472,281
METHOD OF AND APPARATUS FOR HYDROGENATING UNSATURATED COMPOUNDS
Filed Feb. 24, 1921
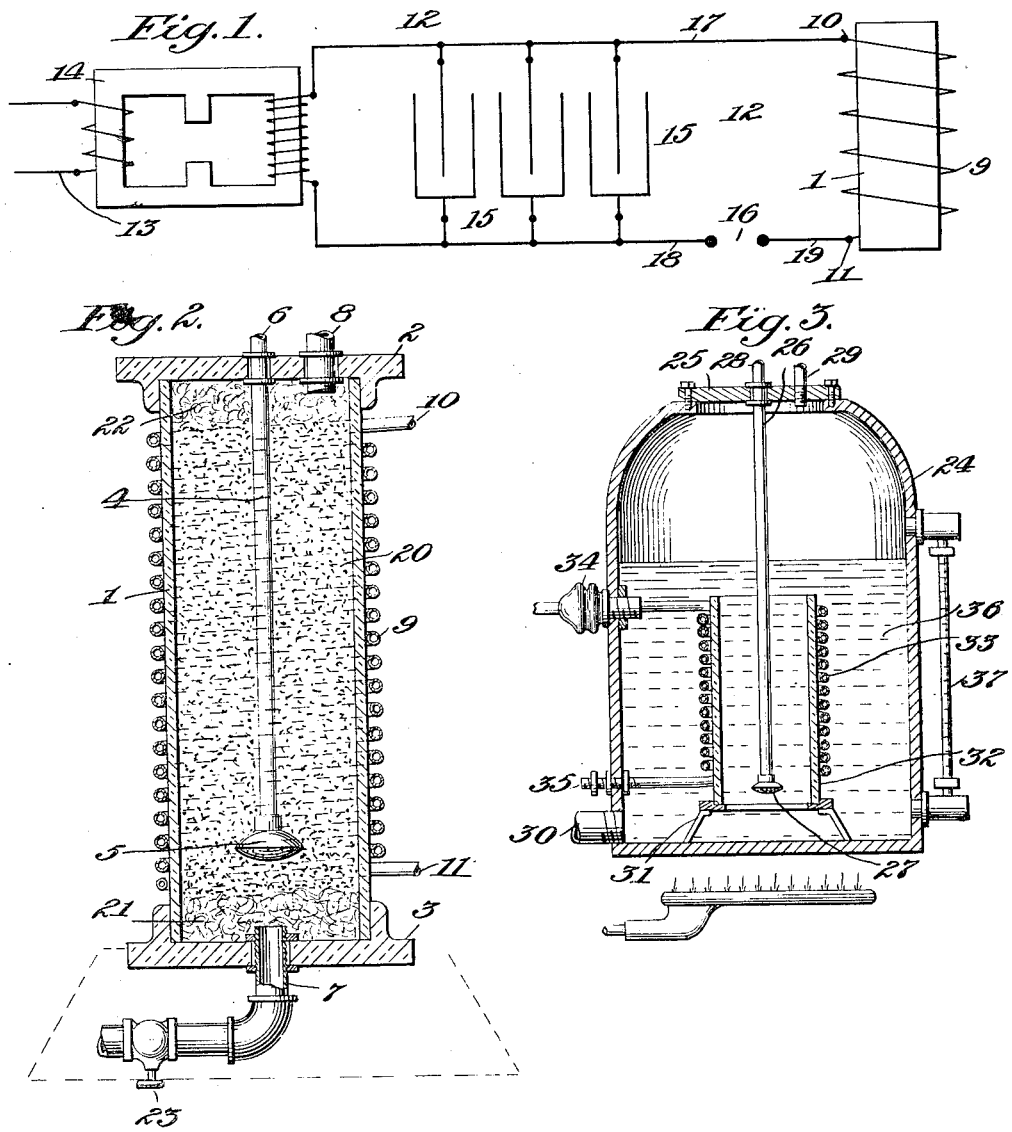
Inventor:
Carl M. Page, Patented Oct. 30, 1923.

1,472,281

UNITED STATES PATENT OFFICE.

CARL M. PAGE, OF CHICAGO, ILLINOIS.

METHOD OF AND APPARATUS FOR HYDROGENATING UNSATURATED COMPOUNDS.

Application filed February 24, 1921. Serial No. 447,578.

*To all whom it may concern:*

Be it known that I, CARL M. PAGE, a citizen of the United States, residing at Chicago, in the county of Cook and State of Illinois, have invented certain new and useful Improvements in Methods of and Apparatus for Hydrogenating Unsaturated Compounds, of which the following is a specification, reference being had therein to the accompanying drawing.

This invention relates, broadly, to the hydrogenization of unsaturated compounds and, more particularly, to processes in which the catalyst is maintained continually at a high degree of activity.

The primary object of the invention is to effect constant regeneration of the catalyst by means acting within the catalyst itself in order that it may continually function with a high degree of efficiency.

A more specific object of the invention is to provide an effective method of catalytically treating oleaginous material and involves the constant and automatic regeneration of the catalytic agent electrically; and, in one aspect of the inventive-concept, the electric current is induced within the catalyst itself, resulting in a constant regenerative effect within the same and a high degree of activity thereof.

A still further object of the invention is to provide a simple form of apparatus for practicing the aforementioned method, whereby an unsaturated body is hydrogenated in the presence of a mass of catalyzing material and such material is maintained at the highest degree of activity by effecting its constant and automatic regeneration; this being accomplished, in one aspect of the invention, by inducing an electric current within the catalyst itself, such current being, preferably, of relatively low voltage and high amperage.

My improved hydrogenation process is adapted especially to the treatment of unsaturated hydrocarbon oils, animal and vegetable oils (known as the glycerol esters of the fatty and unsaturated acids), and similar masses or substances; and it is to be understood that the expressions "oil", "oleaginous material", and the like terms, wherever herein used, are intended to include organic compounds of the open-chain series, such as those found (for example) in the class of the glycerids of fatty acids, fatty acids themselves, the esters of the fatty acids, unsaturated hydrocarbons, etc.

The catalysts which are employed in practicing my process are preferably those suitable to the characteristics of the oils to be treated and the product to be formed; and, in this connection, I may mention that any metallic catalyst which is electrically conductive, such as nickel (known to promote rapid reaction between the oil and the hydrogen-gas), copper, iron, platinum, and other metals having the power of catalyst to a greater or lesser degree; such metals being a matter of selection in accordance with their catalytic power; and I may here state that the catalyst is employed preferably in a fragmental and finely-divided state because its power as a catalyst is then most apparent and results in an increase of contact-surface.

The constant and useful regenerative effect secured within the catalyst, as aforementioned, is produced by an electric current induced within the catalyst itself by reason of its presence within a high frequency oscillating electromagnetic field: In other words, the invention is predicated upon the discovery that a current of resulting low voltage and high amperage induced within the catalyst itself effects the automatic revivifying of its activity.

My improved process may be carried into practice by any suitable apparatus; but I have found that those which are herein illustrated are types that are particularly well adapted for the purpose.

In the accompanying drawings, wherein I have shown two species of apparatus—one being especially designed to operate the process continuously, while the other involves a non-continuous operation;

Fig. 1 is a diagrammatic view of the several instrumentalities utilized in carrying the process into effect;

Fig. 2 is a view in vertical section of the continuous type of apparatus; and

Fig. 3 is a similar view of the non-continuous apparatus.

Referring to these drawings, and particularly to Fig. 2, the reference-character 1 designates a cylindrical tube, container or cell, preferably made of glass, porcelain, quartz, bakelite, or other dielectric.

Mounted on the upper end of this cylinder is a dielectric head-cap 2.

Secured to the lower end of the cylinder is a dielectric base-cap 3. Depending from the head-cap 2 is a pipe 4 having at its lower end a nozzle or spray-head 5 and communicating, at its upper end, with an inlet-element 6 which connects with a suitable source of supply of hydrogen. Preferably, the pipe 4 is of a length sufficient to dispose the nozzle 5 in proximity to the lower end of the cylinder 1.

Leading into the base-cap 3 is a raw-oil inlet-element or pipe 7 adapted to introduce oil, from a suitable source of supply, adjacent the bottom of the cylinder and, preferably, in alinement with the pipe 4 and nozzle 5.

Leading out of the head-cap 2 is a treated-oil discharge-element or pipe 8.

Encircling the cylinder 1 and not in electrical contact therewith is a helix 9 which, in this instance, is shown as in the form of tubing having terminals 10 and 11, respectively, for connection to a high frequency circuit 12 shown diagrammatically in Fig. 1 and including a generator of high frequency oscillating currents consisting, essentially, of a source (13) of alternating current involving, say, a 110-volt 60-cycle current, connected to a step-up transformer 14 in which the voltage is raised from 110 volts up to, say, 10,000 volts, or even 30,000 or more volts. This high-voltage current is then led to a circuit which includes a high-voltage condenser 15—15, and a spark-gap 16. The wiring is marked 17—18—19. By reason of the several turns of the helix, within which is inclosed the hydrogenating cell 1, high frequency currents flow through the turns of this helix to induce a high frequency electro-magnetic field within the helix. Such high frequency currents are generated by proper relations of the capacity of the condensers, the induction of the helix, and the spark-gap, as is well understood. That is to say, by properly proportioning these three factors—the condenser, the spark-gap, and the inductance—I am enabled to increase the frequency of the cycles or oscillations to whatever may be necessary to meet the requirements.

The high frequency electro-magnetic field, aforementioned, induces currents of relatively low voltage and high amperage in a catalytic mass 20 in the cell 1 and, thus, within the electro-magnetic field. Thus, a high frequency current of either an oscillating or a unidirectional, character is maintained through the helix.

The helix 9 is preferably tubular; and, while in this instance it is shown as round in cross-section; it nevertheless may be flattened. Where tubular in form, water or oil may be circulated therethrough for cooling the helix. It may, however, be an electrical conductor of wire.

By reason of the fact that the catalyst is, in this instance, fragmental and composed of metallic particles, powerful currents within these individual particles may be induced and, thus, the regenerative effect secured within the catalyst is produced by the electric currents induced within the catalyst itself by reason of the presence of the particles within a high frequency oscillating electro-magnetic field. It will be understood that this field exists within the helix surrounding the hydrogenation-cell 1, and is generated by the high frequency high tension current circulated through the helix. The helix represents the primary of an oscillation-transformer—being the means by which energy is transferred from the helix to the metallic catalyst—and the catalyst, itself, acts as the secondary of the transformer. The eddy currents generated within the catalyst are of comparatively low voltage and high amperage which results in the production of heat. This heat, within the catalyst, is generated uniformly throughout the mass of the individual catalyst-particles immersed in the oil, and as radiation of this heat-energy is from the surface of the catalyst to the oil, the center of the metallic catalyst mass (comprising the minute individual particles) is at a higher temperature than the surface, with a resulting automatic revivification of the activity of the catalyst.

The container or cell 1 is made of an insulating material or dielectric, such as glass, porcelain, quartz, bakelite, or other material suitable for the penetration into the contained catalyst mass of the high frequency electromagnetic field.

While I have herein specified the desirability of utilizing a current of high frequency and high tension; it is nevertheless to be understood that, in a measure, results could be obtained with currents of low tension and low frequency, currents of low tension and high frequency, and currents of high tension and low frequency; but the same degree of efficient transfer of the energy could not thereby be secured, nor the same degree of temperature be maintained in the finely-divided catalyst. My method depends, for its highest efficiency, upon maintaining a high frequency electro-magnetic field as it acts more favorably on the chemical change desired and produces a profound molecular tension—in effect similar to high pressure. The currents of relatively low voltage and high amperage, induced within the catalyst itself, is by reason of the influence of the high frequency oscillating electro-magnetic field produced within the coil or helix by the currents of high tension and high frequency.

It is to be understood that, by a proper correlation of certain factors—such as the voltage, the frequency of the outside circuit in the helix, and the size and magnetic permeability of the particles of the metallic catalyst—a wide range of temperatures may be secured. The catalyst preferably employed is a metal (such as nickel) for promoting the rapid reaction between the oil and the hydrogen-gas. If preferred, however, a catalyst comprising copper, iron, platinum, or other metal having the power of catalysts, may be utilized; and, to secure an increase of the contacting surface between the catalyst and the oil, I prefer that, whatever metal is used, it shall be fragmental and in a finely-divided state but of a size to entrap it in a fixed position within the cylindrical cell and, thus, enable the oil to be treated and the hydrogen-gas to be fed into the container at a constant rate. To this end, metal-wool, or glass, may be disposed both at the bottom—as at 21—and at the top—as at 22—of the cell.

The oil is introduced into the lower portion of the cell through the inlet 7 and, if desired, may be preheated; but the proper and necessary temperature, for the greatest speed of the reaction, may best be secured by the heat radiated by the catalyst alone.

In this particular embodiment of apparatus, the process may be operated continuously, inasmuch as the catalyst remains in a fixed position, while the oil being treated is caused to pass through the cell at a predetermined rate, the flow of the oil being controlled, as by a valve 23 on the oil-inlet 7.

The hydrogen is introduced into the cell either at normal pressure, or under pressure, as required. In some instances, it may be advantageous to operate the entire process either above or below that of atmospheric pressure; and it is within the contemplation of my inventive-concept to operate it at above or below normal pressure, as conditions may require.

It is to be understood that while the cell is, itself, stationary, a certain amount of motion is imparted to the oil by the oscillating field.

The time required for the treatment of any particular kind of oil or unsaturated compound is, of course, determinable by the degree of hydrogenation desired. By reason of the constant superactivity of the catalyst and the added beneficent effect of the electro-magnetic field in practicing my method, the rate at which hydrogenation may be carried out is much greater than with any method with which I am familiar. As a result, unsaturated bodies may be treated in the most rapid and efficient manner, while absolute control of the amount of hydrogen added is possible, and the quality of the product is under ready control of the operator. As a result of actual practice of the method, I have found that the efficiency of the catalyst actually increases after the process is started and continues at this point of superactivity indefinitely.

While I prefer to utilize the continuous process above described, inasmuch as it permits of a smaller plant for a given capacity per day; nevertheless, for some purposes, what may be called a "single-charge" or non-continuous process may be utilized as being within the principles of my invention and, for some purposes, may possess advantages.

For this non-continuous process, I preferably utilize a somewhat different form of apparatus, such as that illustrated in Fig. 3, and in which the catalyst employed is in a finely-divided colloidal state and is recovered by precipitation from each treated charge.

This apparatus includes a container 24 having its upper, open end provided with a top-plate 25 through which projects a pendent pipe 26 having at its lower end a spray-nozzle 27 and connected, adjacent the plate, with a hydrogen-supplying or inlet pipe 28. The top-plate 25 is also provided with a gas-vent 29. Leading into the lower portion of the container 24 is a charging and discharging pipe 30 for the introduction and withdrawal of the oil into and from the container. Disposed within this container and suitably supported therein, as by a stand or sustaining-structure 31, is an open-ended cylinder or cell 32, made of insulating material or a dielectric, such as porcelain, glass, or the like. This cell is encompassed by a coil or helix 33, preferably of tubular form, and electrically connected to terminals 34 and 35, respectively, for connection to a high frequency circuit, such as that illustrated in Fig. 1 and hereinabove described.

Within the container 24 is a body of oil 36 containing a suspended colloidal catalyst. The quantity of the oil is regulable and may be determined by the scale 37.

The pipe 26 extends down into the cell 32, and the oil is introduced into the container below the plane of the spray-nozzle 27.

Where this non-continuous or single-charge process is employed, precipitation may be accomplished by raising the temperature of the mass above its melting point and allowing the catalyst to precipitate by gravity; or, while it still is in a melted condition, by passing the oil through a centrifuge of appropriate type (and not herein shown) whereby the metal may be rapidly removed, after which it may be immediately reintroduced into a fresh charge of oil that is to be treated in the cell. To raise the temperature of the mass, as aforementioned, a heat-producing instrumentality—such as a gas heater 38—is disposed beneath the container, as shown in Fig. 3.

While I contemplate that the method is to be practiced so that hydrogen may be added to the molecules of the oil being treated; nevertheless, it is to be understood that, in some instances, by practice of the same method, the hydrogen may be substituted for oxygen or other elements present in the oil.

From the foregoing, it will be perceived that I have developed a very economical and highly efficient method of effecting hydrogenization of oleaginous masses, and, also, various types of apparatus for practicing such method.

What I claim is:

1. The method of hydrogenating oleaginous material which includes treating the same in the presence of a catalytic mass and hydrogen, and regenerating the mass by an electric current induced within the mass itself.

2. The method of hydrogenating oleaginous material which includes treating the same in the presence of a catalyzer and hydrogen and simultaneously regenerating the catalyzer in the presence of an induced current of electricity.

3. The method of hydrogenating oleaginous material which includes treating the same in the presence of hydrogen and a catalyzer and simultaneously and constantly regenerating the catalyzer in the presence of an electric current induced in the catalyzer itself.

4. The method of treating oleaginous material which consists in passing the same through a catalytic mass, simultaneously contacting hydrogen with the material, and electrically regenerating the mass by an electric current directly induced in the presence of the catalytic mass.

5. The method of treating oleaginous material which includes flowing the same in the presence of hydrogen and a catalytic mass simultaneously, and regenerating the mass in the presence of an electric current induced directly in the presence of the catalytic mass.

6. The method of treating unsaturated bodies which consists in passing the same through a catalyst, simultaneously introducing hydrogen into the material, and inducing an electric current constantly within the catalyst itself to effect regeneration thereof.

7. The method of treating material of an oily nature which consists in passing the same through an electrically-conductive catalytic mass, simultaneously contacting hydrogen with the material, and inducing an electric current within the catalytic mass to effect regeneration thereof.

8. The method of hydrogenating oil and like materials which consists in continuously forcing a stream of hydrogen through a stream of oil and passing both the hydrogen and oil through a catalytic mass, and revivifying the mass constantly by inducing an electric current therein.

9. The method of hydrogenating oil and similar materials which consists in passing a stream of hydrogen through the oil moving as a countercurrent to the hydrogen through a catalytic mass, separating the hydrogenated oil from the mass, and revivifying the mass in the presence of a current of electricity induced directly in the presence of the catalytic mass.

10. The method of hydrogenating oil which consists in continuously supplying separate streams thereof and of hydrogen into contact with a catalyzer and with each other to effect reduction of the oil, and in simultaneously revivifying the catalyzer by inducing an electric current within the catalyzer itself.

11. The herein-described continuous process of hydrogenating oil and other unsaturated compounds which consists in passing a stream thereof through a catalyzer, in simultaneously adding hydrogen thereto, in constantly revivifying the catalyzer by inducing an electric current therein, and in separating the hydrogenated product from the catalyzer.

12. The method of hydrogenating oil and other unsaturated compounds in the presence of a mass of catalyzing material, forcing a stream of hydrogen at a predetermined velocity therethrough, and generating an induced electric current in the presence of the catalyzer to revivify it.

13. The method of hydrogenating oil which consists in circulating hydrogen continuously through a flowing stream of the oil, the flow of the oil and the hydrogen being in opposite directions and through a catalyzer, in simultaneously revivifying the catalyzer by an induced electric current to maintain its activity at a relatively high degree, and in subsequently separating the hydrogenated product from the catalyzer.

14. The method of hydrogenating unsaturated bodies which consists in passing a stream thereof in liquid form through a mass of catalytic material, simultaneously contacting hydrogen with the material by countermoving the hydrogen therethrough, and simultaneously regenerating the catalytic material by an electric current induced within it.

15. The method of hydrogenating unsaturated bodies which consists in passing a stream thereof through a mass of electrically-conductive catalytic material, contacting hydrogen therewith by countermoving it through the material, and simultaneously regenerating the catalytic material by inducing within it an electric current of relatively low voltage and high amperage.

16. The method of treating material containing unsaturated bodies which consists in passing a stream thereof through a mass of catalytic material, in simultaneously contacting hydrogen with the material, and in effecting a constant regenerative effect within the catalyst to maintain a high degree of activity thereof by inducing a current of relatively low voltage and high amperage within the catalyst itself.

17. The method of treating material containing unsaturated bodies which consists in passing a stream thereof in liquid form through a catalytic agent, in simultaneously contacting hydrogen with the material being treated by flowing the hydrogen in opposition to the stream of material, and in effecting constant and automatic regeneration of the catalytic agent.

18. The method of treating material containing unsaturated bodies which consists in passing a stream thereof in liquid form through a mass of catalytic material, in simultaneously contacting hydrogen therewith by moving it in opposition to the stream of material being treated, in continuously passing the material through the catalytic material, and in effecting a constant and automatic regeneration of the catalytic material.

19. The method of treating material containing unsaturated bodies which consists in passing a stream of the material in liquid form through a catalytic mass, in simultaneously flowing hydrogen through the material in opposition thereto, continuing the passing of the material through the same catalytic mass, and in effecting constant and automatic regeneration of the catalytic mass by inducing an electric current within the mass itself whereby superactivity thereof is maintained.

20. The method of hydrogenating oil which consists in continuously supplying oil and hydrogen into a container in intimate contact with each other, continuously passing the oil and hydrogen in opposite directions through a body of finely-divided catalyzer to reduce the oil, in continuously removing the reduced product and effecting its separation from the catalyzer, and in constantly effecting revivifying of the catalyzer electrically.

21. The method of hydrogenating an oleaginous mass which consists in continuously supplying separate streams of oil and hydrogen to a container, causing said streams to impinge upon each other, simultaneously passing these two elements through a catalyzing mass, separating the hydrogenated product from the catalyzer, and simultaneously effecting revivifying of the catalyzer by an electric current induced directly in the presence of the catalyzer.

22. The method of hydrogenating an oleaginous mass which consists in continuously supplying separate streams of oil and hydrogen to a container, causing said streams to impinge upon each other, simultaneously passing these two elements through a catalyzing mass, separating the hydrogenated product from the catalyzer, and simultaneously effecting revivifying of the catalyzer by inducing a current of low voltage and high amperage within the catalyzer.

23. The method of treating material containing unsaturated bodies which consists in passing a stream thereof through a catalytic mass, in simultaneously contacting hydrogen as a countercurrent with the material, and in effecting a constant and automatic regeneration of the catalytic mass by inducing an electric current within the mass itself to effect its regeneration and superactivity.

24. The method of treating material containing unsaturated bodies which consists in passing a stream thereof through a catalytic mass, in simultaneously contacting hydrogen as a countercurrent with the material, and progressively increasing the efficiency of the catalytic mass and indefinitely maintaining it superactive by constantly inducing an electric current therein.

25. The method of treating material containing unsaturated bodies which consists in passing a stream thereof through a relatively stationary catalytic mass, in simultaneously forcing hydrogen through the material, and in constantly revivifying the catalytic mass by continuously inducing an electric current within the mass itself.

26. The method of treating material containing unsaturated bodies which consists in passing a stream thereof through a relatively stationary catalytic mass, in simultaneously passing hydrogen as a countercurrent through the material, in continuing the passing of the material through the mass and in contact with the hydrogen, and in continuously revivifying the mass by inducing an electric current of relatively low voltage and high amperage within the mass itself, whereby it is regenerated and its activity maintained at a relatively high degree.

27. The method of treating material containing unsaturated bodies which consists in passing a stream thereof through a relatively stationary catalytic mass, simultaneously passing hydrogen through the material, continuously regenerating the catalytic mass, and varying the temperature thereof in accordance with conditions of the material being treated.

28. The method of treating material of an oily nature containing unsaturated bodies which consists in continuously passing a stream thereof through a relatively stationary catalytic mass, in simultaneously bringing a countercurrent of hydrogen-containing gas into contact with the oily material, and in inducing an electric current within the mass itself for effecting its regeneration and then maintaining its activity at a relatively high degree.

29. The method of treating material of an oily nature and including unsaturated bodies which consists in passing a pre-heated stream thereof through a relatively stationary catalytic mass, in simultaneously bringing hydrogen-containing gas into contact with the oily material, and in inducing an electric current within the mass for effecting its regeneration and then maintaining its activity at relatively high degree.

30. The method of treating material containing unsaturated bodies which consists in passing a stream thereof through a fragmental, non-rigid, electrically-conductive catalytic mass, in simultaneously contacting hydrogen with the material, and in simultaneously inducing within the catalytic mass itself an electric current of relatively low voltage and high amperage.

31. The method of treating material containing unsaturated bodies which consists in passing a stream thereof through a fragmental, non-rigid, electrically-conductive catalytic mass, in simultaneously contacting hydrogen with the material, in generating an electric current of high tension and high frequency, and in simultaneously thereby inducing a current within the catalytic mass itself for maintaining effective activity thereof.

32. The method of hydrogenating oil which consists in atomizing the same with hydrogen, passing the oil and hydrogen in contact with and through a mass of finely-divided, electrically-conductive catalyzing material, simultaneously revivifying the catalyzing material by inducing an electric current within the same, and constantly withdrawing the hydrogenated product free from admixture with the catalyzing material.

33. The method of hydrogenating oil which consists in continuously supplying oil and hydrogen into a container in intimate contact with each other, continuously passing the oil and hydrogen in opposite directions through a body of fragmental catalyzer to reduce the oil, continuously removing the reduced product and effecting its separation from the catalyzer, and constantly effecting revivifying of the catalyzer by inducing an electric current therein.

34. Apparatus for the hydrogenation of oil and other unsaturated compounds, comprising a container, a catalyzer housed therein, means for passing a stream of oil through the container, means for passing a stream of hydrogen-gas through the oil in counter-opposition to its movement, and means for revivifying the contained catalyzer by inducing an electric current therein of low voltage and high amperage and comprising a helix operatively associated with the container, and instrumentalities for generating an electric current of high tension and high frequency.

35. Apparatus for hydrogenating oil and other unsaturated compounds, including a cell, a helix operatively associated therewith, means connected with the helix for generating an electric current of high tension and high frequency, a catalyzer associated with and influenced by the helix, and means for passing oil and hydrogen through the cell.

36. Apparatus for hydrogenating unsaturated compounds, including a cell, a helix operatively associated therewith, means for passing the compound and hydrogen through the cell, a catalyzer actively associated with the cell, and means connected to the helix for generating an electric current and inducing within the catalyzer a current of relatively low voltage and high amperage constantly to revivify the catalyzer.

37. Apparatus for hydrogenating unsaturated compounds, including a cell of a dielectric, a helix operatively associated therewith, means for passing the compound and hydrogen through the cell, a catalyzer actively associated with the cell, and means connected to the helix for generating an electric current and inducing within the catalyzer a current of low voltage and high amperage constantly to revivify the catalyzer.

38. Apparatus for the hydrogenation of oil comprising a closed container including a cell, a mass of catalyzing material associated with the cell, means extending into the container for introducing thereinto separate streams of oil and hydrogen, respectively, and for directing the stream of hydrogen against the stream of oil, and means for revivifying the catalyzing material including a helix associated with the cell, and means for generating an electric current in the helix of high tension and high frequency to induce a current within the catalyzing material of low voltage and high amperage.

39. As a step in the art of hydrogenating oleaginous material in the presence of a catalyst, the effecting of an induced electric current in such catalyst itself to regenerate it constantly.

In testimony whereof I affix my signature in presence of two witnesses.

CARL M. PAGE.

Witnesses:
J. E. MULQUEEN,
C. F. BAFSHAW.